(12) United States Patent
Ko et al.

(10) Patent No.: US 8,295,193 B2
(45) Date of Patent: Oct. 23, 2012

(54) METHOD FOR TRANSMITTING AND RECEIVING FEEDBACK INFORMATION

(75) Inventors: Hyun Soo Ko, Gyeonggi-do (KR); Bin Chul Ihm, Gyeonggi-do (KR); Jin Young Chun, Gyeonggi-do (KR); Sung Ho Park, Gyeonggi-do (KR); Wook Bong Lee, Gyeonggi-do (KR); Moon Il Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 77 days.

(21) Appl. No.: 12/525,804

(22) PCT Filed: Feb. 5, 2008

(86) PCT No.: PCT/KR2008/000747
§ 371 (c)(1),
(2), (4) Date: Aug. 4, 2009

(87) PCT Pub. No.: WO2008/097041
PCT Pub. Date: Aug. 14, 2008

(65) Prior Publication Data
US 2010/0097949 A1    Apr. 22, 2010

Related U.S. Application Data

(60) Provisional application No. 60/888,308, filed on Feb. 5, 2007.

(30) Foreign Application Priority Data

May 21, 2007    (KR) .................. 10-2007-0049183

(51) Int. Cl.
*G01R 31/08* (2006.01)
*H04K 1/10* (2006.01)

(52) U.S. Cl. ........ 370/252; 370/329; 370/342; 370/260; 370/203; 375/260; 375/259; 375/267; 375/299; 455/69; 455/452.2; 455/67.13; 455/522.1

(58) Field of Classification Search .................. 370/252, 370/329, 342, 260, 203; 375/260, 259, 267, 375/299, 295; 455/69, 452.2, 67.13, 522.1
See application file for complete search history.

(56) References Cited

U.S. PATENT DOCUMENTS 7,031,664 B2 *   4/2006   Lee et al. ................... 455/67.13
(Continued)

FOREIGN PATENT DOCUMENTS
EP            1533966          5/2005
(Continued)

OTHER PUBLICATIONS

Samsung, "Principles of CQI Report," 3GPP TSG RAN2 #52, R2-0601021, Mar. 2006, XP-050130758.

*Primary Examiner* — Michael Thier
*Assistant Examiner* — Jamal Javaid
(74) *Attorney, Agent, or Firm* — Lee, Hong, Degerman, Kang & Waimey

(57) ABSTRACT

A method for efficiently transmitting and receiving feedback information is disclosed. A cluster size as a unit for computing the feedback information and a reporting period of the feedback information are not uniformly determined by a base station. Information about a downlink channel status of each user equipment is reported, the cluster size and feedback period for computing and reporting the feedback information are determined using the information about the downlink channel status of each user equipment, and the feedback information is transmitted/received, thereby improving system capability.

8 Claims, 4 Drawing Sheets

U.S. PATENT DOCUMENTS

| | | |
|---|---|---|
| 7,697,622 B2 * | 4/2010 | Han et al. .................... 375/260 |
| 2005/0201474 A1 * | 9/2005 | Cho et al. .................... 375/260 |
| 2006/0223449 A1 | 10/2006 | Sampath et al. |
| 2007/0042717 A1 * | 2/2007 | Alexiou et al. ............... 455/69 |
| 2007/0104283 A1 * | 5/2007 | Han et al. .................... 375/260 |
| 2008/0057969 A1 * | 3/2008 | Agami et al. ................ 455/450 |
| 2008/0153506 A1 * | 6/2008 | Yin et al. .................... 455/452.2 |
| 2009/0060064 A1 | 3/2009 | Futaki et al. |

FOREIGN PATENT DOCUMENTS

| | | |
|---|---|---|
| EP | 1569403 | 8/2005 |
| WO | 2005-076758 | 8/2005 |
| WO | 2006-107037 | 10/2006 |

\* cited by examiner

[Fig. 1]
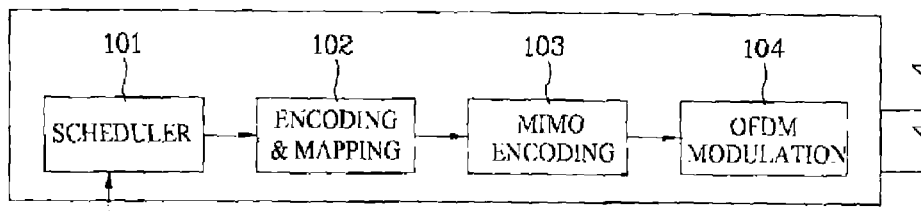
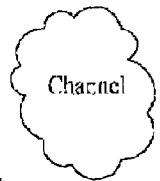
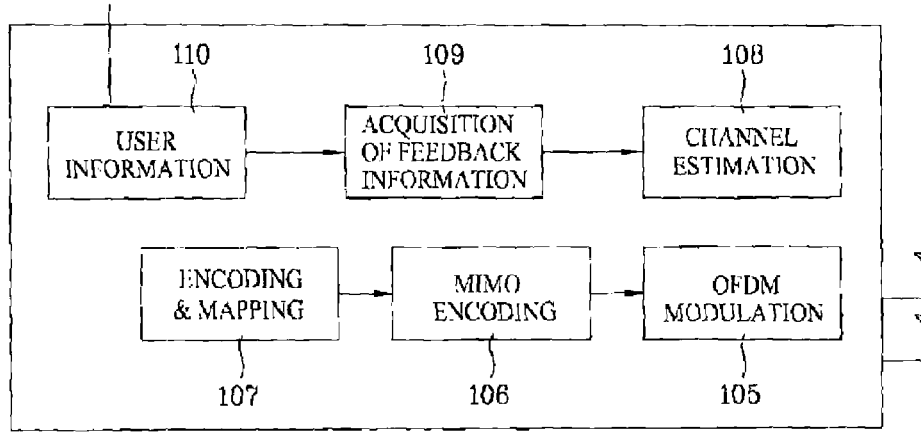

[Fig. 2]
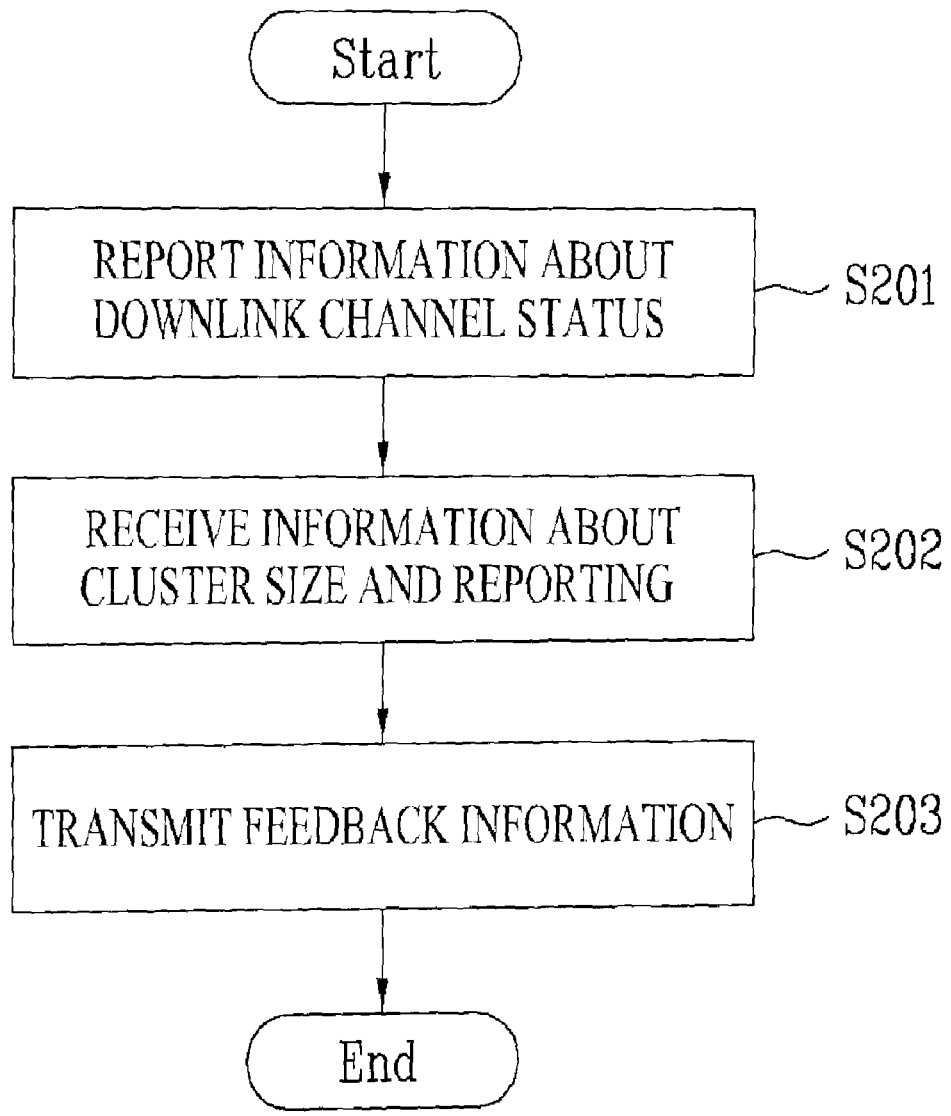

[Fig. 3]
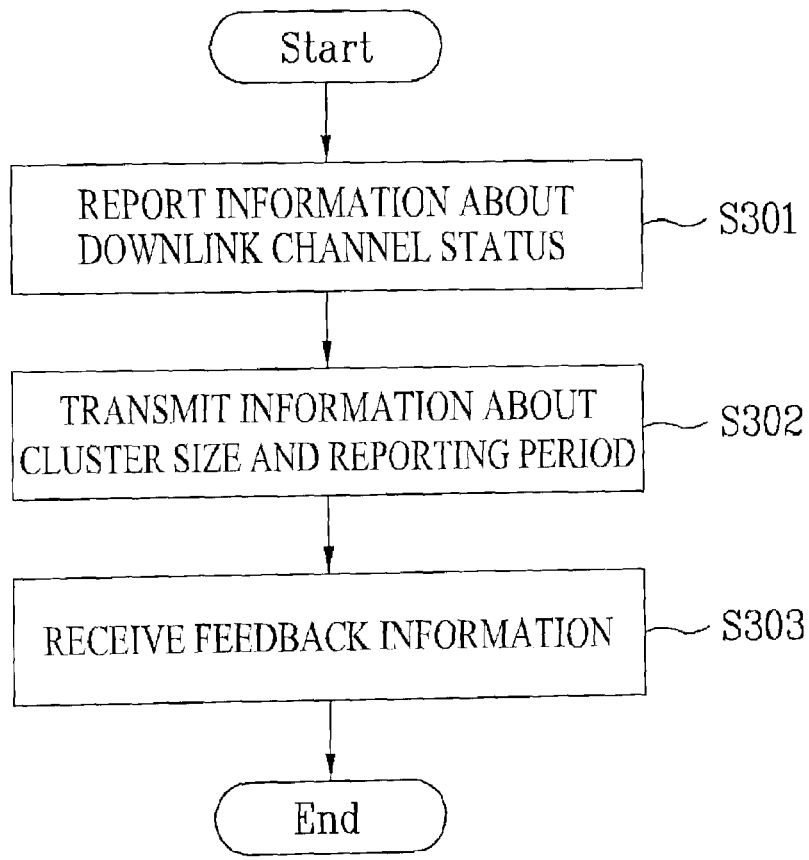
[Fig. 4]
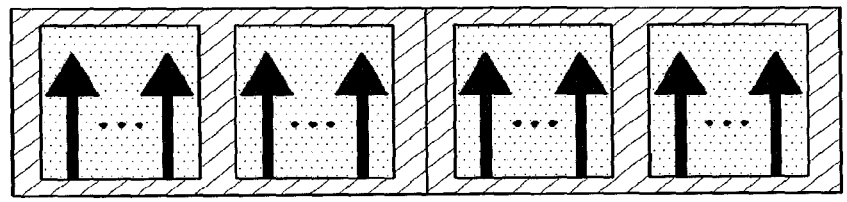
↑ : Resource Block
▫ : Cluster for CQI
▨ : Cluster for PMI

[Fig. 5]
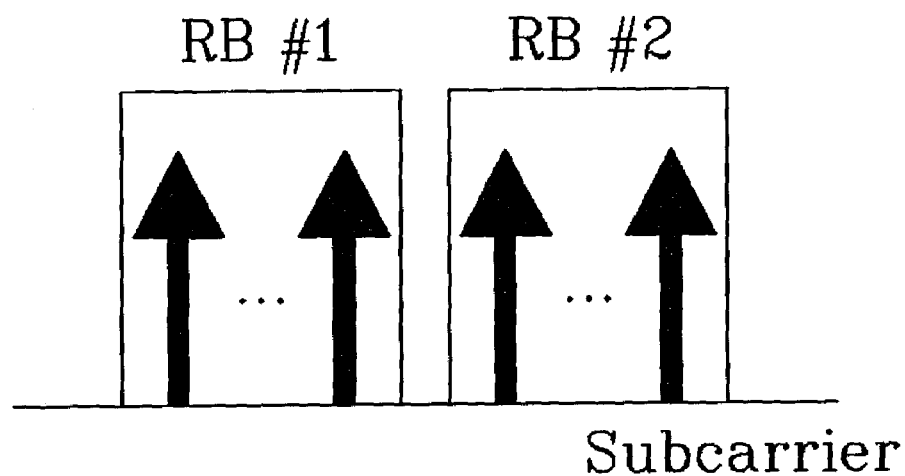
[Fig. 6]
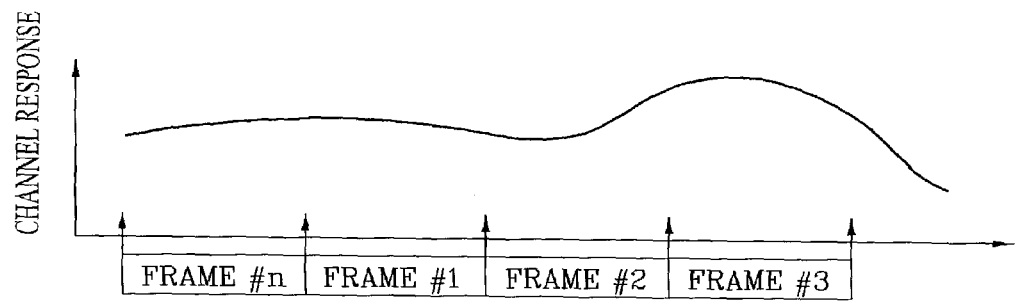

US 8,295,193 B2

METHOD FOR TRANSMITTING AND RECEIVING FEEDBACK INFORMATION

CROSS-REFERENCE TO RELATED APPLICATIONS

This application is a national stage application of International Application No. PCT/KR2008/000747, filed on Feb. 5, 2008, which claims the benefit of earlier filing date and right of priority to U.S. provisional application No. 60/888,308, filed on Feb. 5, 2007, and Korean application No. 10-2007-0049183, filed on May 21, 2007.

TECHNICAL FIELD

The present invention relates to feedback information of a communication system, and more particularly to, a method for transmitting and receiving feedback information in consideration of a downlink channel status of a user equipment.

BACKGROUND ART

In a communication system, a reception side transmits feedback information of a signal received from a transmission side so as to accomplish efficient communication. The transmitted feedback information will now be briefly described in, for example, a multiple input-multiple output (MIMO) communication.

FIG. 1 is a schematic diagram showing the configurations of transmission and reception sides in a general MIMO communication system and information fed back from the reception side.

First, a scheduler 101 of the transmission side 100 allocates transmission signals to adequate communication resources using the feedback information received from the reception side. Thereafter, the transmission signals are subjected to encoding and mapping 102, MIMO encoding 103 and OFDM modulation 104 and are transmitted through a channel. The reception side 190 receives the transmission signals and performs inverse processes of the processes performed by the transmission side. That is, the reception signals are subjected to OFDM demodulation 105, MIMO decoding 106 and decoding and demapping 107 so as to acquire transmission information. The reception side 190 performs channel estimation 108 using the OFDM-demodulated signals and acquires the feedback information (109) which will be used in MIMO decoding 106 and be fed back to the transmission side. The feedback information configures user information 110 and is fed back to the transmission side 100 as shown in FIG. 1.

The feedback information of the reception side 190 is divided into feedback information related to an orthogonal frequency division multiplexing (OFDM) system and feedback information related to an MIMO system, both of which will now be described.

In the OFDM system, channel quality information (hereinafter, abbreviated to CQI) and channel status information (for example, a signal-to-interference and noise ratio (SINR) or a signal-to-noise ratio) measured by a user equipment (hereinafter, abbreviated to UE) are fed back to a base station. The base station allocates resources and determines the level of modulation and coding scheme on the basis of the feedback information.

A MIMO-OFDM system may be divided into an open loop (hereinafter, abbreviated to OL) mode and a close loop (hereinafter, abbreviated to CL) mode. In the OLMIMO system, the UE reports the same feedback information as the existing OFDM system to the base station. In contrast, in the CL-MIMO system, the UE transmits additional information used in downlink transmission, such as channel information, a weighted value, a precoding matrix index (PMI), and a phase for a CDD method.

A precoded CL-MIMO system will now be described. The UE estimates a PMI which is most suitable for a current channel status. The CQI value varies according to the estimated PMI. In general, the UE selects a PMI, which most increases the CQI, from PMIs applied to the same channel and reports the CQI value to the base station.

In the MIMO system, the number of ranks which are applied according to the status of the channel may be determined. The UE may inform the base station of information indicating how many ranks should be applied in the current channel status, for most efficient transmission.

The MIMO system may be operated by the OL mode and the CL mode as described above. In general, the OL mode is used in a high-speed status and the CL mode is used in a low-speed status. The UE selects one of the OL mode or the CL mode and informs the base station of the mode.

The UE transmits the feedback information in consideration of feedback overhead in a predetermined period. In general, several subcarriers are clustered and computed, rather than measurement of a value corresponding to one subcarrier. Information about a reporting period of the feedback information of the UE and a frequency cluster is not informed from each UE to the base station, that is, it is determined by the base station and is informed to each UE.

All the UEs experience different channel statuses. Therefore, if the base station determines a cluster size and reporting period, which are not suitable for the channel statuses of the UEs, in a state in which the base station does not know the statuses of the UEs, system capability may deteriorate.

DISCLOSURE OF INVENTION

Technical Problem

In the precoded MIMO system, the CQI may vary according to the PMI as described above. However, if the cluster size for computing the CQI and the cluster size for computing the PMI are arbitrarily determined, the PMI and the CQI, both of which are different from those reported by the UEs, may be used.

Technical Solution

Accordingly, the present invention is directed to a method for transmitting and receiving feedback information that substantially obviates one or more problems due to limitations and disadvantages of the related art.

An object of the present invention devised to solve the problem lies on a method for transmitting and receiving feedback information, which is capable of efficiently reducing the amount of feedback information and improving system capability by determining and using a cluster size for computing feedback information such as a CQI and a PMI and a period for reporting the feedback information in consideration of downlink statuses of UEs.

The object of the present invention can be achieved by providing a method for transmitting feedback information at a user equipment (UE), the method including: generating and transmitting information about a downlink channel status of the UE to a base station; receiving a cluster size as a unit for generating the feedback information which is determined by the base station in consideration of the information about the downlink channel status; and generating the feedback information according to the received cluster size and transmitting the generated feedback information to the base station. At this time, if the UE receives the information about the reporting period of the feedback information from the base station, the UE can transmit the feedback information in the received reporting period.

At this time, the information transmitted by the UE may include information for determining the cluster size and the reporting period according to the downlink channel status of the UE. In more detail, the information transmitted by the UE may include at least one of a coherence bandwidth and a coherence time of a downlink channel.

In addition, the feedback information may include at least one of downlink channel quality information (CQI) and a precoding matrix index (PMI). At this time, in the determined cluster size, it is preferable that a larger one of a cluster size as a unit for generating the downlink CQI and a cluster size as a unit for generating a weighted value used in downlink precoding is a multiple of the other.

The generating and transmitting of the information about the downlink channel status of the UE may be performed in a period which is a predetermined multiple of the reporting period of the feedback information.

In another aspect of the present invention, provided herein is a method for receiving feedback information at a base station, the method including: receiving information about a channel status of each user equipment from at least one UE; determining and transmitting a cluster size as a unit for generating the feedback information in consideration of the received information to the at least one UE; and receiving the feedback information generated according to the cluster size from the at least one UE.

If the base station determines and transmits the reporting period of the feedback information to the at least one UE, the base station may receive the feedback information in the reporting period. Preferably, the determining and transmitting of the reporting period of the feedback information to the at least one UE may include increasing the reporting period to be transmitted to the UE as a coherence time received from the UE is increased.

Preferably, the determining and transmitting of the cluster size to the at least one UE may include increasing the cluster size to be transmitted to the UE as a coherence frequency received the UE is increased.

According to an embodiment of the present invention, since a cluster size as a unit for computing the feedback information and a reporting period of the feedback information are not uniformly determined by a base station, that is, are determined in consideration of downlink channel statuses of UEs, it is possible to reduce the amount of unnecessary feedback information and improve system capability. Preferably, since a cluster size for computing a CQI and a cluster size for computing a PMI have a multiple relationship, it is possible to prevent wrong feedback information from being transmitted.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 1 is a schematic diagram showing the configurations of transmission and reception sides in a general MIMO communication system and information fed back from the reception side;

FIG. 2 is a flowchart illustrating a method for transmitting feedback information at a user equipment (UE) according to an embodiment of the present invention;

FIG. 3 is a flowchart illustrating a method for receiving feedback information at a base station according to an embodiment of the present invention;

FIG. 4 is a view illustrating a method for determining cluster sizes for computing a channel quality information (CQI) and a precoding matrix index (PMI) according to an embodiment of the present invention;

FIG. 5 is a view showing the structure of a resource block in a 3GPP LTE system; and FIG. 6 is a view illustrating a period for reporting the CQI in a general communication system.

BEST MODE FOR CARRYING OUT THE INVENTION

Hereinafter, preferred embodiments of the present invention will be described in detail with reference to the accompanying drawings. The present invention will become more fully understood from the detailed description provided herein below and the accompanying drawings which are given by way of illustration only, and thus do not limit the present invention.

The following detailed description includes details in order to provide complete understanding of the present invention. However, it will be apparent to those skilled in the art that the present invention can be embodied without the details. In some cases, known structures and devices are omitted in order to avoid ambiguity of the concept of the present invention or main functions of the structures and the devices are shown in a block diagram. The same reference numbers will be used throughout the drawings to refer to the same or like parts.

As described above, the present invention relates to a method for transmitting and receiving feedback information, which is capable of efficiently reducing the amount of feedback information and improving system capability by determining and using a cluster size for computing feedback information such as a channel quality information (CQI) and a precoding matrix index (PMI) and a period for reporting the feedback information in consideration of downlink statuses of user equipments (UEs). Hereinafter, the methods according to embodiments of the present invention will be described in view of a UE and a base station.

FIG. 2 is a flowchart illustrating a method for transmitting feedback information at a UE according to an embodiment of the present invention.

First, in a step S201, the UE generates and reports information about a downlink channel status to the base station. In more detail, the information reported by the UE indicates information for determining a cluster size and a reporting period of feedback information according to a downlink channel status of each UE and may include at least one of a coherence bandwidth and a coherence time of the downlink channel.

Thereafter, in a step S202, the UE receives information about the cluster size and the reporting period, both of which are determined by the base station in consideration of the information transmitted in the step S201. The information may be received through a dedicated channel of each UE or a common channel of all UEs serviced by the base station.

Next, in a step S203, the UE generates feedback information according to the cluster size determined by the base station through the information received in the step S202 and transmits the generated feedback information in the reporting period of the feedback information determined by the base station. At this time, the transmitted feedback information may include a downlink CQI, weighted value information used in downlink precoding, and PMI information of a precoded MIMO system.

In the method for transmitting the feedback information according to the embodiment of the present invention, the cluster size and the reporting period for computing and reporting the feedback information are not uniformly determined by the base station, that is, they are determined in consideration of the downlink channel statuses of the UEs, thereby reducing the amount of unnecessary feedback information. The step S201 of reporting the downlink channel state of each UE does not need to be performed every reporting period and may be performed in a period which is a predetermined multiple of the period for reporting the feedback information according to the channel status of each UE. For example, in a UE of which a channel is hardly changed, the reporting period of the downlink channel status of the UE may be set to be larger than the reporting period of the feedback information.

Now, a method for receiving the feedback information at the base station will be described.

FIG. 3 is a flowchart illustrating a method for receiving feedback information at a base station according to an embodiment of the present invention.

The method for receiving the feedback information at the base station according to the embodiment of the present invention shown in FIG. 3 corresponds to the method for transmitting the feedback information at the UE according to the embodiment of the present invention shown in FIG. 2. That is, in a step S301, the base station receives the information indicating the downlink channel status of each UE from each UE included in a cell. At this time, the received information may include the coherence frequency and the coherence time as described above.

Thereafter, in a step S302, the base station determines the cluster size and the reporting period of the feedback information about the basis of the information received from each UE and transmits the cluster size and the reporting period of the feedback information to each UE. Accordingly, each UE generates the feedback information according to the cluster size determined in consideration of the status of each UE and transmits the feedback information in the reporting period of the feedback information determined by the base station, and the base station receives the feedback information in the period (step S303).

In the above-described embodiments, the cluster size determined by the base station may be set in consideration of the type of the feedback information. For example, if the feedback information includes the CQI and the PMI as described above, a cluster size for computing the CQI and a cluster size for computing the PMI may be different from each other. Accordingly, in a preferred embodiment of the present invention, a method for adjusting the cluster sizes if the cluster size for computing the CQI and the cluster size for computing the PMI is suggested.

FIG. 4 is a view illustrating a method for determining cluster sizes for computing a CQI and a PMI according to an embodiment of the present invention.

As described above, in the precoded MIMO system, the CQI may vary according to the PMI. However, if the cluster size for computing the CQI and the cluster size for computing the PMI are arbitrarily determined, a PMI and CQI which are different from those reported by the UE may be used. Accordingly, in one embodiment of the present invention, if the cluster size for computing the CQI and the cluster size for computing the PMI are different from each other, a larger one of the cluster sizes for the CQI and the PMI is set to be a multiple of the other.

In more detail, as shown in FIG. 4, if the cluster size for computing the CQI is 1 RB, the cluster size for computing the PMI is preferably 1 RB, 2 RB, which is a multiple of 1 RB. In FIG. 4, the cluster size for computing the PMI is 2 RB.

If the cluster size for computing the CQI and the cluster size for computing the PMI are small, the CQI information may be first transmitted and a PMI covering most RBs may be transmitted.

Hereinafter, the process of transmitting/receiving the feedback information according to the above-described embodiments will be described in detail.

According to the above-described embodiments of the present invention, the base station determines the cluster size as the unit for allowing the UE to compute the feedback information and the period for allowing the UE to report the feedback information to the base station, in consideration of the downlink channel status of each UE. Each UE reports the downlink channel information such as the coherence frequency and the coherence time to the base station. The base station may increase the cluster size as the unit for computing the feedback information with respect to a UE having a high coherence frequency reported by each UE and may set the period for reporting the feedback information to be longer than that of the other UE with respect to a UE having a large coherence time. The base station may not necessarily use the information reported by the UE in view of scheduling of a plurality of UEs and may determine a cluster size and a feedback period for a specific UE in view of improvement of the overall system capability.

If the base station determines the cluster size and the feedback period, the UE may generate and transmit the feedback information according to the cluster size and the feedback period. In more detail, for example, a 3GPP LTE system will be described.

FIG. 5 is a view showing the structure of a resource block in the 3GPP LTE system.

In the 3GPP LTE system, as shown in FIG. 5, 12 subcarriers configure one resource block (RB). In FIG. 5, the subcarriers are denoted by arrows. The general reporting of the CQI information is performed in the unit of a RB. However, in the above-described embodiments of the present invention, if N RBs configure one cluster by the base station, each UE computes the CQI in the unit of N RBs.

In more detail, if a signal is transmitted in a precoding method having a rank of 1, a channel value used when computing a CQI value uses $H_{eff}$ in the following math figure.

$$H_{eff} = HP \quad \text{[Math Figure 1]}$$

where, H denotes an actual channel value and P denotes a pilot signal.

Meanwhile, a SINR value of the unit of one subcarrier may be computed using $H_{eff}$ acquired by math FIG. 1 and may be expressed by the following math figure.

$$SINR_k = \frac{|H_{eff}(k)|^2}{\sigma^2 N_{tx}} \quad \text{[Math Figure 2]}$$

where, k denotes a subcarrier index, $N_{tx}$ denotes noise, and $s^2$ denotes a dispersion value in a channel model.

The SINR value of the subcarrier computed may be calculated by the CQI of the unit of the RB using the following capacity math figure.

[Math Figure3]
$$CQI_n = \frac{1}{K}\sum_{k=1}^{K} \log(1 + SINR_k)$$

If N RBs are determined as the cluster size for computing the CQI by the base station like the above-described embodiments of the present invention, the UE may compute the CQI of the unit of a cluster composed of N RBs.

[Math Figure4]
$$CQI_{avg} = \frac{1}{N}\sum_{n=1}^{N} CQI_n$$

Meanwhile, the PMI value is computed according to the cluster size determined by the base station as follows.

In a CL-MIMO system, information for precoding should be reported. For example, in codebook based precoding, a weighted value necessary for precoding is computed on the basis of downlink channel information. At this time, the UE may configure representative values of weighted values as the codebook in order to reduce burden on the feedback of channel information. In this case, the UE selects and transmits a PMI which is most suitable for the channel status to the base station, instead of the channel information.

Meanwhile, if the PMI is calculated for every subcarrier and is transmitted to the base station, capability can be improved, but feedback overhead may be increased. In general, the PMI of the unit of the RB may be computed and fed back as follows.

[Math Figure5]
$$PMI = \max_{argi}\left(\frac{1}{N}\frac{1}{K}\sum_{k=1}^{K} \log\left(1 + \frac{|H(k)P_i|^2}{\sigma^2 N_{tx}}\right)\right)$$

where, k denotes a subcarrier index, H denotes a channel value, P denotes a pilot signal, $N_{tx}$ denotes noise, and K denotes the number of subcarriers included in one RB.

In the above-described embodiments of the present invention, the cluster size for computing the PMI value may be one RB or more. In this case, the PMI of the UE may be computed using the number of subcarriers included in the cluster for the PMI determined by the base station.

In the method for transmitting and receiving the feedback information according to the embodiment of the present invention, the CQI and the PMI may be computed according to the cluster size determined by the base station. The CQI and the PMI may be reported to the base station according to the reporting period of the feedback information determined by the base station, in consideration of the downlink channel status of each UE.

Hereinafter, the period for reporting the feedback information will be described.

FIG. 6 is a view illustrating the period for reporting the CQI in a general communication system.

That is, as shown in FIG. 6, the report of the CQI or the other information may be transmitted in the unit of a frame or in a constant period according to the request of the base station. FIG. 6 shows a method for reporting the CQI in the unit of two frames.

According to the above-described embodiments of the present invention, the reporting period of the feedback information such as the CQI is determined by the base station which receives the information about the downlink channel status of each UE from the UE. For example, if the coherence time is long in the information reported by the UE, the reporting period of the feedback information of the UE may be set to be longer than that of the other UE. In addition, the reporting period of the feedback information may vary or may not vary according the feedback information.

In a preferred embodiment of the present invention, the cluster size and the reporting period determined by the base station may be adaptively adjusted. For example, the cluster size and reporting period, which are first applied to the UE, may be adjusted by the request of the UE after a predetermined period. That is, in the step of reporting the downlink channel information of each UE, information for requesting the change of the cluster size and the reporting period, both of which are previously determined by the base station, may be further transmitted. In this case, the base station may change the cluster size and the reporting period. The readjustment of the value may be performed by the base station as well as the UE.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

INDUSTRIAL APPLICABILITY

The present invention relates to feedback information of a communication system and is applicable to an algorithm using a method for transmitting and receiving the feedback information, which is capable of efficiently reducing the amount of unnecessary feedback information and improving system capability, and apparatuses related to a mobile communication system.

The invention claimed is:
1. A method for transmitting feedback information at a user equipment (UE), the method comprising:
generating downlink channel information regarding a downlink channel status of the UE;
transmitting the generated downlink channel information to a base station;
receiving a cluster size in response to the transmission of the generated downlink channel information, the cluster size for generating the feedback information;
transmitting the generated feedback information to the base station;
wherein the generated feedback information includes at least downlink channel quality information (CQI) and a precoding matrix index (PMI); and
wherein the cluster size for generating the feedback information including the downlink CQI is determined as a multiple of the cluster size for generating the feedback information including the PMI, and the cluster size for generating the feedback information including the PMI is determined as a multiple of the cluster size for generating the feedback information including the downlink CQI.
2. The method according to claim 1, wherein the generated feedback information further includes weighted value information for downlink precoding.

3. The method according to claim 1, wherein the generated downlink channel information includes information for determining the cluster size according to the downlink channel status of the UE.

4. The method according to claim 3, wherein the generated downlink channel information further includes a coherence bandwidth and a coherence time of a downlink channel.

5. The method according to claim 1, further comprising receiving information regarding a feedback reporting period of the generated feedback information,
   wherein transmitting the generated feedback information comprises transmitting the generated feedback information to the base station according to the feedback reporting period.

6. The method according to claim 5, wherein the reporting period of the generated downlink channel information is a predetermined multiple of the feedback reporting period.

7. The method according to claim 5, wherein the generated downlink channel information includes information for determining the feedback reporting period according to the downlink channel status of the UE.

8. The method according to claim 7, further comprising transmitting a request to the base station requesting a change of the cluster size and the feedback reporting period.

* * * * *